No. 733,291. PATENTED JULY 7, 1903.
G. W. SMITH.
THILL COUPLING.
APPLICATION FILED MAR. 28, 1903.
NO MODEL.
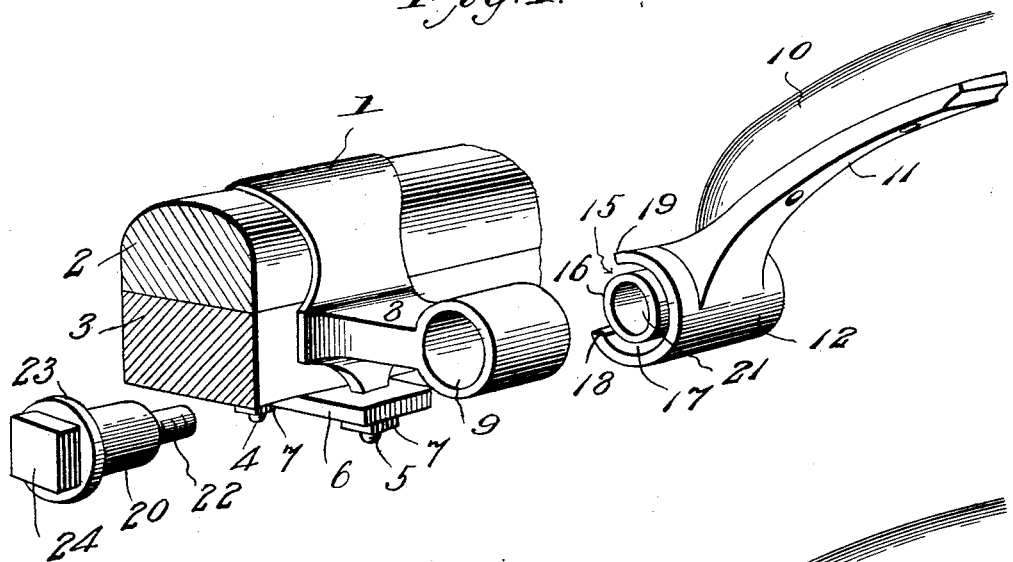
Fig. 1.
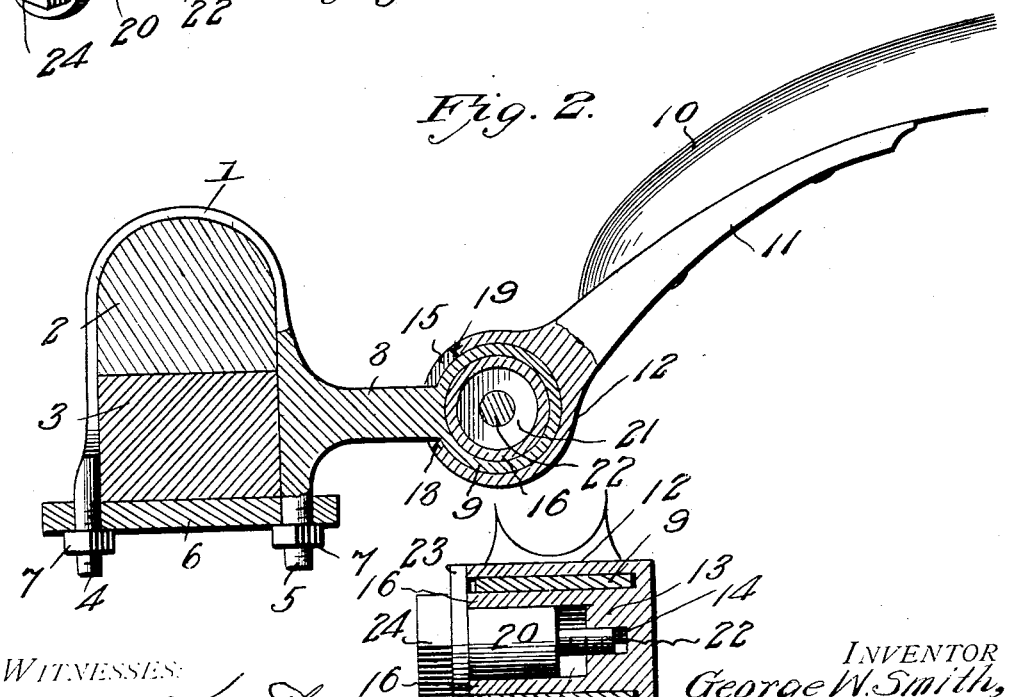
Fig. 2.
Fig. 3.
WITNESSES:
INVENTOR
George W. Smith,
BY Victor J. Evans
Attorney No. 733,291. Patented July 7, 1903.

UNITED STATES PATENT OFFICE.

GEORGE W. SMITH, OF WORCESTER, MASSACHUSETTS.

THILL-COUPLING.

SPECIFICATION forming part of Letters Patent No. 733,291, dated July 7, 1903.

Application filed March 28, 1903. Serial No. 150,043. (No model.)

*To all whom it may concern:*

Be it known that I, GEORGE W. SMITH, a citizen of the United States, residing at Worcester, in the county of Worcester and State of Massachusetts, have invented new and useful Improvements in Thill-Couplings, of which the following is a specification.

This invention relates to thill-couplings; and the object thereof is to provide a coupling which will effectually secure the thill to the axle or bolster of a vehicle.

Other objects, as well as the novel details of construction, will be specifically set forth in the following description and illustrated in the accompanying drawings, in which—

Figure 1 is a disassociated view in perspective of the several parts of my coupling. Fig. 2 is a vertical longitudinal sectional view through the coupling and thill-iron, the parts being assembled; and Fig. 3 is a sectional view on the line 3 3 of Fig. 2, the fastening device for the coupling-sections being shown in elevation.

The reference-numeral 1 designates an approximately inverted-U-shaped clip, which is provided to fit over the bolster and axle, (designated by the reference-numerals 2 and 3.) The depending terminals of the clip are shaped in the form of bolts with threaded extremities 4 and 5. A clip-plate 6 bears against the under side of the axle 3 and is formed with openings through which project the threaded extremities of the clip. The plate 6 is clamped against the under side of the axle by nuts or taps 7, which are threaded on the extremities of the clip in the usual manner.

The reference-numeral 8 designates a forwardly-projecting horizontally-disposed bar, on one end of which is a tubular socket 9, cylindrical in form and provided for the reception of the head of the opposite coupling member. The coupling member carried by the thill 10 comprises a thill-iron 11, having at its rear extremity a cylindrical head 12 formed therewith, said head being closed at one end by an integral plug 13, formed with a central threaded opening or socket 14. A slot 15 is also formed in the head 12 and is disposed longitudinally thereof, so that the bar 8 can fit between the edges thereof when the head is sleeved upon the tubular socket 9. In order that the head can be conveniently sleeved upon this socket, the diameter of the head is slightly in excess of the diameter of the socket, so that one can fit within the other. A concentric tubular flange 16 is formed within the cylindrical head 12, the walls of said flange being parallel with the wall of the head, and this flange is of approximately the same diameter as the interior diameter of the socket 9, in which it is designed to rest.

By reference to Fig. 3 it will be observed that a groove or space 17 is formed between the walls of the head 12 and the flange 16, which space is of substantially the same width as the thickness of the wall of the socket 9. Thus it will be apparent that when two members are brought together they will snugly fit one within the other, permitting a partial rotation of the head upon the socket, which movement will be limited by the edges 18 and 19 of the groove 15, which will act as stops as they come in contact with the bar 8. The two members are fastened together by a fastening device 20, comprising a cylindrical body or core fitting into the cylindrical recess 21, formed by the flange 16. On one end of the cylindrical bearing is a restricted threaded projection or pin 22 to fit into and engage the threads of the recess 14 in the plug 13. A disk or head 23 is formed on the other end of the fastening device and is designed to bear against the open end of the head 12, so as to prevent a displacement of the coupling members when they are in proper operative position. An angular head 24 is formed on one end of the fastening device and adjacent to the disk, so that a wrench or suitable tool can be used to secure the fastening device in proper relative position with the remaining portion of the coupling. The length of the space 20 formed by the walls of the head 12 and the tubular flange 16 is slightly in excess of the length of the socket or tube 9. When the parts are assembled, the outer edge of the member 9 will be spaced away from the head or disk 23, so that no wear will occur thereon.

It will be apparent that a strong, durable, and efficient coupling will be provided if constructed in accordance with my invention, and while I have specifically described what to me at this time appears to be the best form of coupling I reserve the right to make such slight changes and alterations as would fairly fall within the scope of the accompanying claims.

Having thus described the invention, what is claimed as new is—

1. A thill-coupling comprising two members, one of which is formed with a tubular socket, the other member consisting of a thill-iron formed with a cylindrical head and an interiorly-arranged tubular flange carried by the head and parallel therewith to form a space for the reception of the socket, the lengths of the walls of the head and flange slightly exceeding that of the socket for the purpose set forth.

2. In a thill-coupling, the combination with a supported arm having a tubular socket on its free end, of a thill-iron formed on one end with a cylindrical head fitting over the socket and provided with a longitudinally-disposed slot through which the arm projects, and a tubular flange carried by the head and fitting in the socket for the purpose set forth.

In testimony whereof I affix my signature in presence of two witnesses.

GEORGE W. SMITH.

Witnesses:
SAM. K. MILLIKEN,
PIERRE H. AUTHIER.